United States Patent [19]

Bender et al.

[11] Patent Number: 5,053,462
[45] Date of Patent: Oct. 1, 1991

[54] MODIFIED POLYISOBUTENE

[75] Inventors: Dietmar Bender, Schifferstadt; Klaus Bronstert, Carlsberg, both of Fed. Rep. of Germany

[73] Assignee: BASF Aktiengesellschaft, Ludwigshafen, Fed. Rep. of Germany

[21] Appl. No.: 567,748

[22] Filed: Aug. 15, 1990

[30] Foreign Application Priority Data

Aug. 31, 1989 [DE] Fed. Rep. of Germany ....... 3928811

[51] Int. Cl.$^5$ .................. C08F 267/04; C08F 222/04; C07D 307/60
[52] U.S. Cl. ................................ 526/285; 526/272; 549/233
[58] Field of Search ................. 525/285; 526/272; 549/233

[56] References Cited

U.S. PATENT DOCUMENTS

| | | |
|---|---|---|
| 4,029,592 | 6/1977 | Puskas et al. |
| 4,316,973 | 2/1982 | Kennedy. |
| 4,767,885 | 8/1988 | Kennedy. |

FOREIGN PATENT DOCUMENTS

| | | |
|---|---|---|
| 0064924 | 11/1982 | European Pat. Off. |
| 0265053 | 4/1988 | European Pat. Off. |
| 2548194 | 4/1985 | France. |
| 1247404 | 10/1989 | Japan. |

OTHER PUBLICATIONS

Polymer Bulletin, 21, 1989, pp. 5-12, M. Zsuga et al., "Electron Donors in Carbocationic Polymerization".
Polymer Bulletin, 21, 1989, pp. 125-131, R. Faust et al., "Living Carbocationic Polymerization".
Polymer Bulletin, 18, 1987, pp. 433-440, Mah et al., "New Telechelic Polymers and Sequential Copolymers by Polyfunctional Initiator-Transfer Agents (Inifers)".
Polymer Bulletin, 18, 1987, pp. 123-130, G. Kaszas et al.
Polymer Bulletin, 20, 1988, pp. 221-228, W. Guanying et al., "The Synthesis of Chlorine-Terminated Telechelic Polyisobutylene".
Polymer Bulletin, 20, 1988, pp. 229-236, W. Guanying et al., "The Synthesis of Chlorine-Terminated Telechelic Polyisobutylene".

*Primary Examiner*—Joseph L. Schofer
*Assistant Examiner*—Wu C. Cheng
*Attorney, Agent, or Firm*—Oblon, Spivak, McClelland, Maier & Neustadt

[57] ABSTRACT

A modified polyisobutene has the general formula I

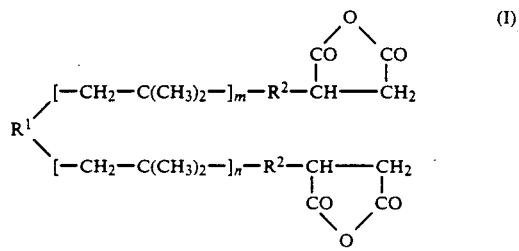

where $R^1$ is an olefinically unsaturated divalent radical, $R^2$ is one of the radicals $-CH_2-C(=CH_2)-CH_2-$ or $-CH_2-C(CH_3)=CH-$ or m and n are each a degree of polymerization in particular from 1 to 1000.

3 Claims, 1 Drawing Sheet

MODIFIED POLYISOBUTENE

The present invention relates to novel, modified polymers of isobutene and to the preparation thereof by reacting the terminal double bond of polyisobutene, which is obtainable by dehydrohalogenation of the reaction products of the carbocationic polymerization of isobutene, with maleic anhydride.

The carbocationic polymerization of isobutene is possible, as will be known, by means of olefinic initiators of the general structure A or B $$X—R^1—X \quad (A)$$

or

(B)

where $R^1$ is a divalent, olefinically unsaturated radical, X is halogen, alkoxy or alkanoyloxy, and Y is oxygen or an OCO group. $BCl_3$ is used as coinitiator.

Olefinic initiators have the advantage over aromatic initiators that secondary reactions of the reactive chain ends with the initiator are avoided. There is no formation of indan structures—cf. Polymer Bulletin 18 (1987), 123; 20 (1988), 221; 20 (1988), 229—which, owing to their low reactivity, dramatically reduce the usefulness of the telechelics. On the contrary, the functionality (i.e. proportion of reactive chain ends) of the telechelics corresponds to the expected value of 2.

Initiator compounds of the general structures $A^1$ and $B^1$

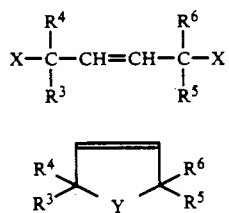

where $R^3$, $R^4$, $R^5$ and $R^6$ may each be hydrogen or alkyl or alkoxy each of from 1 to 20 carbon atoms, are described in Polymer Bulletin 21 (1989), 5–12 and 125, and 18 (1987), 433.

Figure 1:
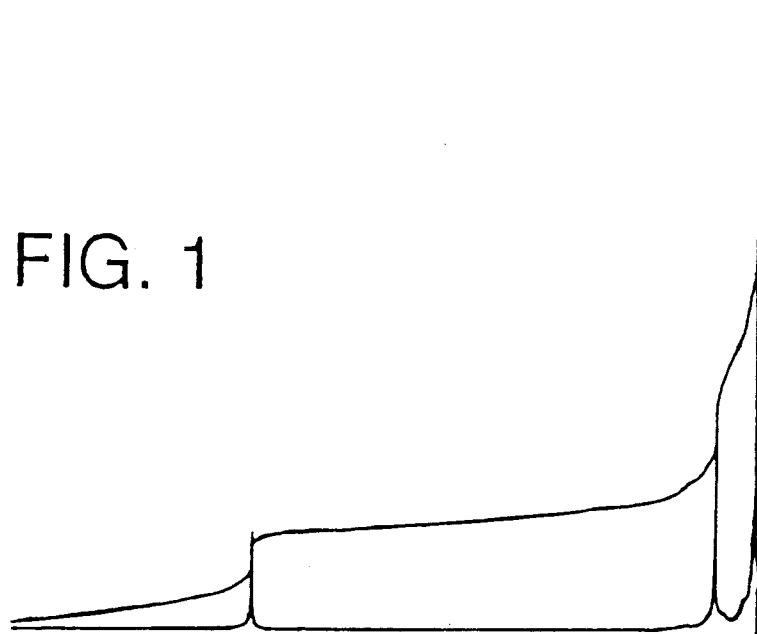
FIG. 1 is the $^1$H-NMR spectrum of the product obtained in Example 1.
Figure 2:
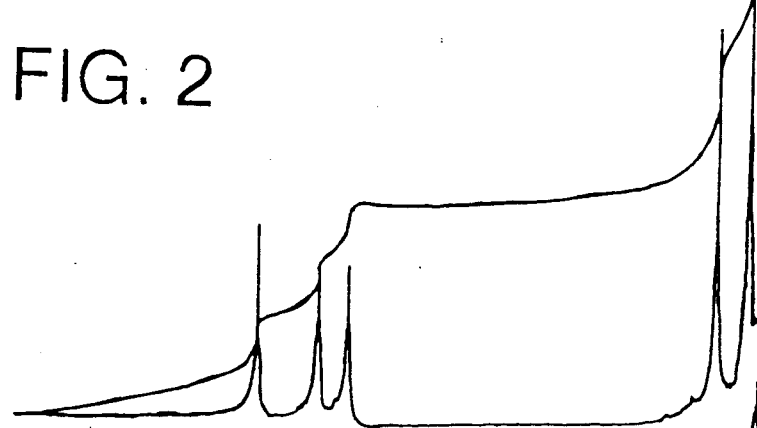
FIG. 2 is the $^1$H-NMR spectrum of the product obtained in Example 2.
Figure 3:
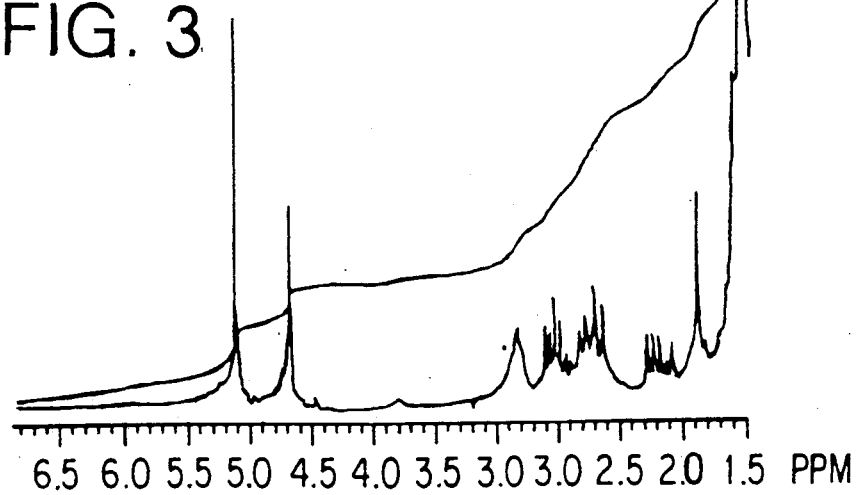
FIG. 3 is the $^1$H-NMR spectrum of the product obtained in Example 3.

For most applications, the end group —CH$_2$—C(CH$_3$)$_2$Cl formed in the course of the polymerization is not sufficiently reactive, so that it needs to be converted into a hydroxyl, carboxyl or epoxy group. The central intermediate of these conversions is an H$_2$C=CCH$_3$—CH$_2$-terminated telechelic which is obtainable from the Cl-terminated precursor by dehydrohalogenation, for example with potassium tert-butoxide. Following this reaction an olefinically initiated telechelic contains two terminal double bonds as well as the double bond from the initiator. Whereas the subsequent reactions of telechelics formed from an aromatic initiator sequence take place without secondary reaction at the initiator unit, owing to the different reactivities of the aromatic moiety and the double bonds, there is a danger in the case of telechelics incorporating an olefinic initiator unit that the central double bond will react as well as the end groups. Examples, such as the cleavage of the central double bond with OsO$_4$, are known from Polymer Bulletin 18 (1987), 433. Reactions with olefinically initiated telechelics of isobutene have evidently not been described before for that reason.

We have found that olefinically terminated telechelics of isobutene which are initiated by means of an olefinic initiator can be reacted selectively at the terminal double bonds with maleic anhydride. This makes available novel compounds of the general formula I.

The present invention accordingly provides modified polymers of isobutene of the general structure I

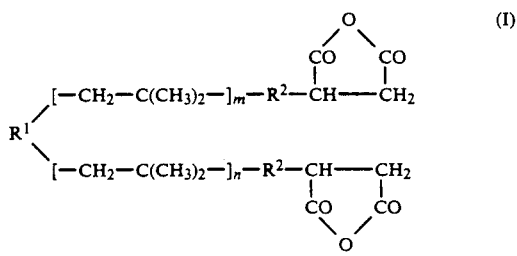

where m and n are each the particular degree of polymerization, preferably from 1 to 1000, $R^1$ is the olefinic radical of the initiator and $R^2$ is one of the divalent radicals

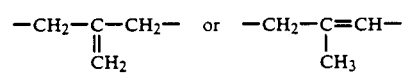

Preferably, $R^1$ has the structure —CR$^3$R$^4$—CH=CH—CR$^5$R$^6$—.

The intermediates required for preparing the polymers I according to the present invention have instead of the -R$^2$-succinyl radical an isobutenyl radical.

In the course of the reaction of the intermediates with maleic anhydride, the terminal CH$_2$=C(CH$_3$)—CH$_2$— groups are converted into divalent radicals of the general formula R$^2$ which represents one of the divalent radicals

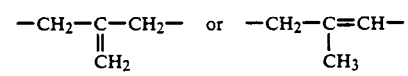

To obtain quantitative reaction of the double bonds with maleic anhydride, the olefinically terminated telechelics are heated to 150°–240° C. with a maleic anhydride excess of up to 20 times. Preference is given to using from 1.5 to 3 times an excess of maleic anhydride and a temperature of from 180° C. to 210° C. It is advisable to carry out the reaction with the exclusion of oxygen, since otherwise there is a pronounced tendency of residues to form. After the reaction, the remaining maleic acid is easily separated from the telechelic by filtration. The course of the reaction can be monitored by means of $^1$H-NMR spectroscopy to record the loss of resonance of the terminal olefinic protons. At a reaction temperature of 200° C. and a 2-fold excess of maleic anhydride, the olefinic signals of the two $CH_2=CCH_3-CH_2-$ end groups will have completely disappeared after 5 hours. By contrast, the resonance of the initiator sequence remains intact. The $^1H$-NMR spectra further reveal that the reaction of these leads to two configurational isomers of the general formula $R^2$ which differ in respect of the position of the newly formed double bond. No isomerization of the terminal $CH_2=CCH_3-CH_2-$ groups to the less reactive $C(CH_3)_2=CH$-groups was observed.

To prepare the $Cl-C(CH_3)_2-CH_2$-terminated first intermediates, preference is given to the abovementioned initiators of the general structures $A^1$ and $B^1$ in which $R^3$, $R^4$, $R^5$ and $R^6$ are each hydrogen, $C_1$-$C_8$-alkyl or substituted or unsubstituted $C_5$-$C_6$-cycloalkyl, X is $C_1$-$C_8$-alkanoyloxy, $C_1$-$C_8$-alkoxy or halogen (Br, Cl), and Y is oxygen or $-O-CO-$.

Particular preference is given to telechelics having alkyl or cycloalkyl groups as substituents ($R^2$ to $R^5$).

To obtain quantitative conversion of all the halogen into olefinic end groups, the telechelic is dissolved in THF, a 4-fold excess of potassium t-butoxide is added, and the mixture is refluxed for 24 hours. If instead of potassium t-butoxide the sodium salt of an n-alcohol is used, not only $H_2C=C(CH_3)-CH_2-$ end groups are formed but also, to a minor extent, $(CH_3)_2C=CH-$ end groups, which show little reactivity toward the maleic anhydride.

EXPERIMENTAL PART

Analytical

The telechelics were characterized by chlorine assay, GPC measurement and $^1H$-NMR spectra.

Cl-Terminated Telechelics $^1H$-NMR spectroscopy makes it possible to distinguish between the protons of the end group and those of the main chain (Polymer Bulletin 3 (1980), 339; 21 (1989), 5). From the intensity ratio of the resonances of terminal methyl and methylene groups at $\delta=1.67$ ppm and 1.96 ppm respectively and of non-terminal methyl and methylene groups at $\delta=1.1$ ppm and 1.4 ppm respectively it was possible to calculate the average molecular weight Mn. This result was confirmed by GPC measurement with polyisobutene calibration and by chlorine assay.

Olefinically Terminated Telechelics

The $^1H$-NMR spectra of the telechelics show the signals of the resulting olefinic end groups which may have a $CH_2=C(CH_3)CH_2-$ or $(CH_3)_2C=CH-$ structure, at separate positions at $\delta=4.62$, 4.85 and 5.15 ppm. From the ratio of the intensity of these resonances to the signal of the olefinic initiator sequence at 5.30 ppm it was possible to determine the degree of dehydrohalogenation. These measurements were supplemented by chlorine assays, which were found to agree with the NMR findings.

Succinic Anhydride-Terminated Telechelics

The $^1H$-NMR spectra of the maleated products are characterized by the absorption at 4.9 ppm and within the range from 3.5 to 2.0 ppm. The complete loss of the olefinic resonances of the $CH_2=CCH_3-CH_2$-terminated precursor indicates quantitative conversion. Information to assist with the accurate assignment of the signals is available in European Polymer Journal 20 (1984), 281–290.

EXAMPLE 1

$Cl-C(CH_3)_2-CH_2$-Terminated Telechelic

In a 4-l stirred reactor equipped with dry ice cooling, 2.5 l of methyl chloride, 200 ml of boron trichloride, 100 ml of methylene chloride and 12.6 g of 2,2,5,5-tetramethyldihydrofuran are mixed with one another for 15 seconds and 210 ml of isobutene are added dropwise in the course of 5 minutes. The mixture is stirred at $-40°$ C. for 6 hours and 600 ml of methanol are then added dropwise. The mixture is warmed to evaporate off the volatile constituents. The telechelic is worked up as usual with water.

EXAMPLE 2

$CH_2=C(CH_3)-CH_2$-Terminated Telechelic 100 g of a Cl-terminated telechelic having a molecular weight Mn of 1500 g/mol are dissolved in 500 ml of THF, and 75 g of potassium t-butoxide are added. The mixture is refluxed for 48 hours and, after the THF has been removed, taken up in toluene, the toluene mixture is extracted with water, and the aqueous extract is concentrated.

EXAMPLE 3

$$\begin{array}{c} CH_2\text{---}CH- \\ | \quad\quad | \\ O=C \quad C=O \\ \diagdown \diagup \\ O \end{array}$$

100 g of an olefinically terminated telechelic having a molecular weight of 1500 g/mol are admixed with 26.4 g of maleic anhydride, and the mixture is heated at 200° C. for 5 hours. After cooling, the batch is taken up in decalin, the insoluble maleic anhydride is filtered off, and the decalin is evaporated off in an oil pump vacuum at 100° C.

The $^1H$-NMR spectra of the three telechelics are shown in the Figure. The spectrum of the maleated telechelic indicates quantitative conversion of all terminal double bonds. The $M_n$ (GPC) increases to 1600 g/mol. The $M_w/M_n$ ratio remains unchanged.

We claim:

1. A compound of the general formula I $$\begin{array}{c} \quad\quad\quad\quad O \\ \quad\quad\quad \diagup \diagdown \\ \quad\quad\quad CO \quad CO \\ \quad\quad\quad | \quad\quad | \\ [-CH_2-C(CH_3)_2-]_m-R^2-CH\text{---}CH_2 \\ R^1 \\ \diagdown \\ [-CH_2-C(CH_3)_2-]_n-R^2-CH\text{---}CH_2 \\ \quad\quad\quad\quad\quad\quad\quad\quad\quad | \quad\quad | \\ \quad\quad\quad\quad\quad\quad\quad\quad\quad CO \quad CO \\ \quad\quad\quad\quad\quad\quad\quad\quad\quad \diagdown \diagup \\ \quad\quad\quad\quad\quad\quad\quad\quad\quad\quad O \end{array} \quad (I)$$

where $R^1$ is an olefinically unsaturated divalent radical, $R^2$ is one of the divalent radicals $$-CH_2-\underset{\underset{CH_2}{\|}}{C}-CH_2-\quad \text{or} \quad -CH_2-\underset{\underset{CH_3}{|}}{C}=CH-$$

and m and n are at least 1.

2. A compound as claimed in claim 1, where $R^1$ has the structure $-CR^3R^4-CH=CH-CR^5R^6-$, where $R^3$, $R^4$, $R^5$ and $R^6$ are each hydrogen or alkyl or alkoxy each of 1 to 20 carbon atoms.

3. A compound as claimed in claim 1, wherein m and n are from 1 to 1000.

* * * * *